US009696644B2

United States Patent
Ida et al.

(10) Patent No.: US 9,696,644 B2
(45) Date of Patent: Jul. 4, 2017

(54) RESIN FOR TONER AND TONER

(71) Applicant: CANON KABUSHIKI KAISHA, Tokyo (JP)

(72) Inventors: Hayato Ida, Yokohama (JP); Takashi Hirasa, Yokohama (JP); Junichi Tamura, Inagi (JP); Yuya Chimoto, Kawasaki (JP); Takaho Shibata, Tokyo (JP); Daisuke Yamashita, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/768,301

(22) PCT Filed: Apr. 8, 2014

(86) PCT No.: PCT/JP2014/060560
§ 371 (c)(1),
(2) Date: Aug. 17, 2015

(87) PCT Pub. No.: WO2014/168252
PCT Pub. Date: Oct. 16, 2014

(65) Prior Publication Data
US 2015/0362853 A1    Dec. 17, 2015

(30) Foreign Application Priority Data

Apr. 9, 2013    (JP) .................................. 2013-081252

(51) Int. Cl.
| | |
|---|---|
| C08G 63/02 | (2006.01) |
| G03G 9/087 | (2006.01) |
| C08G 63/181 | (2006.01) |
| G03G 9/08 | (2006.01) |
| C08G 63/00 | (2006.01) |
| C08G 63/189 | (2006.01) |
| C08J 3/12 | (2006.01) |

(52) U.S. Cl.
CPC ......... *G03G 9/08755* (2013.01); *C08G 63/00* (2013.01); *C08G 63/181* (2013.01); *C08G 63/189* (2013.01); *C08J 3/12* (2013.01); *G03G 9/0804* (2013.01); *G03G 9/0806* (2013.01); *G03G 9/08795* (2013.01); *G03G 9/08797* (2013.01); *C08J 2367/00* (2013.01); *C08J 2367/02* (2013.01)

(58) Field of Classification Search
CPC ............................ C08G 9/08755; C08G 63/16
USPC .......................................... 528/271, 272, 298
See application file for complete search history.

(56) References Cited

U.S. PATENT DOCUMENTS

| | | | |
|---|---|---|---|
| 3,853,778 A | 12/1974 | Buckley et al. | |
| 4,381,379 A | 4/1983 | Toga et al. | |
| 6,013,406 A | 1/2000 | Moriki et al. | |
| 7,390,605 B2 | 6/2008 | Shirai | |
| 7,833,687 B2 | 11/2010 | Kato et al. | |
| 8,614,043 B2 | 12/2013 | Watanabe et al. | |
| 8,697,327 B2 | 4/2014 | Shibata et al. | |
| 8,921,022 B2 | 12/2014 | Ashizawa et al. | |
| 9,057,970 B2 | 6/2015 | Ida et al. | |
| 9,348,247 B2 | 5/2016 | Ida et al. | |
| 2005/0227157 A1 | 10/2005 | Shirai | |
| 2013/0108955 A1 | 5/2013 | Shibata et al. | |
| 2013/0202998 A1 | 8/2013 | Higashi et al. | |
| 2015/0099227 A1 | 4/2015 | Ida et al. | |
| 2016/0002396 A1 | 1/2016 | Ida et al. | |

FOREIGN PATENT DOCUMENTS

| | | |
|---|---|---|
| CN | 1201918 A | 12/1998 |
| CN | 103135383 A | 6/2013 |
| CN | 103376680 A | 10/2013 |
| EP | 1 580 612 | 9/2005 |
| JP | 56-13943 B2 | 4/1981 |
| JP | 57-158222 A | 9/1982 |
| JP | 62-39428 B2 | 8/1987 |
| JP | 4-120554 A | 4/1992 |
| JP | 4-120555 A | 4/1992 |
| JP | 4-239021 A | 8/1992 |
| JP | 04239021 * | 8/1992 |
| JP | 8-36274 A | 2/1996 |
| JP | 2005-300867 A | 10/2005 |
| JP | 2012-118466 | 6/2012 |
| JP | 2012-233037 A | 11/2012 |

OTHER PUBLICATIONS

International Search Report and Written Opinion of the International Searching Authority, International Application No. PCT/JP2014/060560, Mailing Date Jun. 17, 2014.
International Preliminary Report on Patentability, International Application No. PCT/JP2014/060560, Mailing Date Oct. 22, 2015.

\* cited by examiner

*Primary Examiner* — Terressa Boykin
(74) *Attorney, Agent, or Firm* — Fitzpatrick, Cella, Harper & Scinto

(57) ABSTRACT

The present invention provides a crystalline polyester resin having a sharp melt property that realizes both fixing performance and blocking property and demonstrates favorable charging performance, in which the crystalline polyester resin for toner, satisfying the following relationships, $25 \leq Tg \leq 70$, and $(Tg+273)/(Mp+273) \geq 0.75$, wherein Tg (° C.) represents a glass transition temperature of the crystalline polyester resin for toner, and Mp (° C.) represents a melting point of the crystalline polyester resin for toner.

13 Claims, No Drawings

RESIN FOR TONER AND TONER

TECHNICAL FIELD

The present invention relates to a toner used in an image-forming method of an electrophotographic system and a resin for toner that composes the toner.

BACKGROUND ART

Accompanying increasing demands for saving energy in recent years, there is a growing need for a toner capable of fixing at lower temperatures. The use of a polyester resin having a low softening temperature has been proposed as means of lowering fixation temperature. However, the use of an ordinary amorphous polyester resin having a low softening temperature results in the occurrence of blocking due to melt adhesion of toner particles during storage or transport.

Therefore, a technology has been proposed that uses a crystalline polyester resin having a sharp melt property such that viscosity significantly decreases when the melting point is exceeded as means for realizing both blocking resistance and low-temperature fixability (Patent Literatures 1 to 3).

CITATION LIST

Patent Literature

[PTL 1] Japanese Examined Patent Application Publication No. S56-13943
[PTL 2] Japanese Examined Patent Application Publication No. S62-39428
[PTL 3] Japanese Patent Application Laid-open No. H4-120554

SUMMARY OF INVENTION

Technical Problems

When a conventional crystalline polyester resin is used as a binder resin of a toner for electrophotography, although it is superior from the viewpoint of realizing both fixing performance and blocking property due to the sharp melt property of the resin, there are problems in terms of charging characteristics. More specifically, there are the serious problems of low electrical resistivity of the crystalline polymer and gradual leakage of charge after charging.

Therefore, an object of the present invention is to provide a crystalline polyester resin having a sharp melt property that realizes both fixing performance and blocking property and demonstrates favorable charging performance, and a toner containing that crystalline polyester resin.

Solution to Problem

The present invention relates to a crystalline polyester resin for toner, satisfying the following relationships:

$$25 \leq Tg \leq 70, \text{ and}$$

$$(Tg+273)/(Mp+273) \geq 0.75,$$

wherein
Tg (° C.) represents a glass transition temperature of the crystalline polyester resin for toner, and
Mp (° C.) represents a melting point of the crystalline polyester resin for toner.

Advantageous Effects of Invention

According to the present invention, a crystalline polyester resin can be provided that has a sharp melt property, realizes both fixing performance and blocking property, and demonstrates favorable charging performance. In addition, a toner containing the crystalline polyester resin can be provided.

Further features of the present invention will become apparent from the following description of exemplary embodiments.

DESCRIPTION OF EMBODIMENTS

As a result of conducting extensive studies on the problem of the charging performance of crystalline polyester resins, the inventors of the present invention found that a decrease in electric resistance value, caused by the low glass transition temperature and high molecular mobility of crystalline polyester resins used in toner applications, is one of the factors behind this problem. Since crystalline polyester resins having a low melting point able to be used in toners are basically composed of a long-chain alkyl backbone, the glass transition temperature thereof ends up being at or below room temperature. Consequently, movement of the molecular chain under room temperature conditions is unable to be inhibited, thereby resulting in increased susceptibility to the occurrence of charge leakage.

Therefore, the use of a crystalline polyester resin having a high glass transition temperature in a toner is thought to result in favorable charging performance. However, since there is a correlation between glass transition temperature and melting point, the melting point of an ordinary polyester resin having a glass transition temperature equal to or higher than room temperature ends up being 180° C. or higher.

Furthermore, the correlation between glass transition temperature and melting point is empirically known to satisfy the following equation:

$$(\text{glass transition temperature (° C.)}+273)/(\text{melting point (° C.)}+273)=2/3.$$

As a result of conducting extensive studies, the inventors of the present invention found that by increasing crystal interplanar distance in a crystalline polyester resin having a glass transition temperature equal to or higher than room temperature, melting point can be lowered to a suitable range without lowering glass transition temperature.

The following provides an explanation of the present invention.

The crystalline polyester resin for toner of the present invention (hereinafter to also be simply referred to as "crystalline resin") satisfies the following relationships when glass transition temperature is defined as Tg (° C.) and melting point is defined as Mp (° C.):

$$25 \leq Tg \leq 70, \text{ and}$$

$$(Tg+273)/(Mp+273) \geq 0.75.$$

In the case glass transition temperature is lower than 25° C., movement of crystalline resin molecules at room temperature is unable to be inhibited, and as a result thereof, charge retentivity decreases. On the other hand, in the case glass transition temperature exceeds 70° C., fixing performance becomes inferior. In addition, a glass transition temperature of 40° C. or higher is more preferable from the viewpoint of charge retentivity. In addition, a glass transition temperature of 60° C. or lower is more preferable from the viewpoint of fixing performance. In the case emphasis is placed on low-temperature fixability in the crystalline resin of the present invention, a crystalline resin can be selected that has a low glass transition temperature within the above-mentioned range. In the case of emphasizing charge retentivity and blocking property, a crystalline resin can be selected that has a high glass transition temperature within the above-mentioned range.

The glass transition temperature and melting point of the crystalline resin of the present invention become close to each other as a result of satisfying the relationship of $(Tg+273)/(Mp+273) \geq 0.75$. Consequently, even in the case glass transition temperature is equal to or higher than room temperature, melting point decreases to the fixable range of the toner resulting in favorable fixing performance and charging performance.

In addition, glass transition temperature and melting point preferably satisfy the relationship:

$$(Tg+273)/(Mp+273) \geq 0.80$$

and more preferably:

$$(Tg+273)/(Mp+273) \geq 0.85$$

from the viewpoint of simultaneously realizing charging performance, blocking property and fixing performance.

Furthermore, since Tg<Mp, the value of (Tg+273)/(Mp+273) is less than 1.00.

In addition, although any melting point can be used for the melting point Mp of the crystalline resin of the present invention provided it satisfies the above-mentioned conditions, it is preferably 180° C. or lower, more preferably 125° C. or lower and even more preferably 100° C. or lower. As a result of making the melting point to be 180° C. or lower, fixing performance of the toner is ensured in the case of containing in a toner, as a result of making the melting point to be 125° C. or lower, the low-temperature fixability of the toner is superior, and as a result of making the melting point to be 100° C. or lower, low-temperature fixability becomes extremely favorable. On the other hand, although there are no particular limitations on the lower limit value of the melting point, it is preferably 70° C. or higher from the viewpoint of blocking property.

Glass transition temperature (Tg) of the crystalline resin of the present invention is measured in compliance with ASTM D3418-82 using a differential scanning calorimeter (DSC822/EK90, Mettler-Toledo).

More specifically, glass transition temperature (Tg) is measured in the manner indicated below.

i) 0.01 g of sample is weighed in an aluminum pan.

ii) The aluminum pan containing the sample is heated to 200° C. at a ramp rate of 10° C./min.

iii) The aluminum pan containing the sample is cooled from 200° C. to −100° C. at a cooling rate of 10° C./min.

iv) The aluminum pan containing the sample is heated from −100° C. to 200° C. at a ramp rate of 10° C./min, and the amount of endothermic energy (DSC curve) is measured in this step.

The temperature at the intersection on the resulting DSC curve of a line extending from the low-temperature baseline to the high-temperature baseline, and a line drawn at the point tangential to the slope of the curve at the portion of the curve where the glass transition temperature changes in steps reaches a maximum, is the glass transition temperature.

In addition, in the case glass transition temperatures are detected at two or more points, the glass transition temperature detected at the point at the lower temperature is taken to be the glass transition temperature of the crystalline resin of the present invention.

Moreover, the glass transition temperature (Tg) of the crystalline resin of the present invention contained in a toner can be determined by measuring glass transition temperature (Tg) according to the above-mentioned method after having isolated the crystalline resin component from resin contained in the toner. An example of a method for isolating the crystalline resin component includes isolating the crystalline resin component as residue by Soxhlet extraction of the toner with ethyl acetate solvent. Furthermore, the molecular structure of the extraction residue can be confirmed to be that of crystalline resin by measuring the NMR spectrum thereof.

Melting point (Mp) of the crystalline resin of the present invention can be measured in compliance with ASTM D3418-82 using a differential scanning calorimeter (DSC822/EK90, Mettler-Toledo). More specifically, 0.01 g of sample is weighed in an aluminum pan, and calorimetry is carried out while raising the temperature of the sample from room temperature to 200° C. at a ramp rate of 10° C./min. Next, the peak temperature of the endothermic peak as determined from the resulting DSC curve is taken to be the melting point.

In addition, the melting point (Mp) of the crystalline resin of the present invention contained in a toner can be determined by measuring the toner directly using the above-mentioned method. At that time, a melting point attributable to wax present in the toner may be observed. The melting point attributable to crystalline resin can be discriminated from the melting point of the wax by extracting the wax from the toner by Soxhlet extraction using a hexane solvent, carrying out differential scanning calorimetry on the wax only according to the above-mentioned method, and comparing the resulting melting point with the melting point of the toner.

The ratio of low diffraction angle components R (%) in the crystalline resin of the present invention calculated based on measurement by wide-angle X-ray diffraction preferably satisfies the expression indicated below.

$$30 \leq R \leq 100$$

(wherein, $R=(I_{C20}/I_C) \times 100$, $I_{C20}$ indicates the total area of crystalline peaks detected within a range of $5 \leq 2\theta \leq 20$, $I_C$ indicates the total area of crystalline peaks detected within a range of $5 \leq 2\theta \leq 60$, and $2\theta$ indicates a diffraction angle (deg))

The above-mentioned ratio of low diffraction angle components R (%) indicates the abundance of crystals having a large interplanar distance. Consequently, in the case the ratio of low diffraction angle components R (%) is such that $30 \leq R \leq 100$, a large number of components having large crystal interplanar distance are present, and melting point tends to become lower than that based on the commonly known relationship between glass transition temperature and melting point, thereby making this preferable. In addition, if the ratio of low diffraction angle components R (%) satisfies the relationship of $40 \leq R \leq 100$, melting point can be lowered without lowering glass transition temperature, thereby making this more preferable.

In addition, the degree of crystallinity of the crystalline resin of the present invention calculated based on measurement by wide-angle X-ray diffraction is preferably at least 10% and more preferably 20% or more:

degree of crystallinity (%)=$Ic/(Ic+Ia) \times 100$ (wherein, Ic indicates the total area of crystalline peaks detected within a range of $5 \leq 2\theta \leq 60$, and Ia indicates the total area of amorphous scattering detected within a range of $5 \leq 2\theta \leq 60$).

In the case the degree of crystallinity is less than 10%, the proportion of amorphous portions becomes high, and blocking property during high-temperature storage of toner in the case of being contained in a toner tends to decrease.

On the other hand, although there are no particular limitations on the upper limit value of the degree of crystallinity, it is preferably 70% or less from the viewpoint of production efficiency during toner production.

Crystallinity of the crystalline resin of the present invention can be measured by wide-angle X-ray diffraction and assessed based on degree of crystallinity calculated using a formula to be subsequently described, and the crystalline resin of the present invention is considered to be a crystalline resin in the case of having a degree of crystallinity of 1% or more.

The ratio of low diffraction angle components R and degree of crystallinity of the crystalline resin of the present invention can be measured by wide-angle X-ray diffraction under the conditions indicated below.

X-ray diffraction instrument: D8 ADVANCE, Bruker AXS

X-ray source: Cu-K$\alpha$ radiation (wavelength: 0.15418 nm)

Output: 40 kV, 40 mA

Slit system: Slit DS, SS=1°, RS=0.2 mm

Measurement range: $2\theta=5°$ to $60°$

Step interval: 0.02°

Scanning rate: 1°/min

After grinding the crystalline polymer with a mortar, a wide-angle X-ray diffraction profile is obtained under the above-mentioned conditions. The resulting wide-angle X-ray diffraction profile is separated into crystalline peaks and amorphous scattering peaks, and the ratio of low diffraction angle components R and degree of crystallinity are calculated from their respective areas using the above-mentioned expressions (1) and (2). Furthermore, the ratio of low diffraction angle components R (%) and the degree of crystallinity of the crystalline resin of the present invention contained in a toner are determined by isolating the crystalline resin component from the resin contained in the toner followed by measurement of the ratio of low diffraction angle components R (%) and the degree of crystallinity according to the methods described above. An example of a method for isolating the crystalline resin component includes isolating the crystalline resin component as residue by Soxhlet extraction of the toner with ethyl acetate solvent. The molecular structure of the extraction residue can be confirmed to be that of crystalline resin by measuring the NMR spectrum thereof.

The following provides an explanation of the structure of the crystalline resin of the present invention.

Although any crystalline polyester resin can be used for the crystalline polyester resin for toner of the present invention provided it satisfies the above-mentioned physical properties, a crystalline resin obtained by condensation polymerization of a dicarboxylic acid component and a diol component is preferable.

A preferable example of the crystalline polyester resin for toner of the present invention is a crystalline resin obtained by condensation polymerization of a dicarboxylic acid component containing at least one compound selected from the group consisting of terephthalic acid, 2,6-naphthalene dicarboxylic acid and derivatives thereof, and a diol component containing at least one compound selected from the group consisting of 2-methyl-1,3-propanediol, 2,2-dimethyl-1,3-propanediol and derivatives thereof.

In addition, the crystalline polyester resin for toner of the present invention is more preferably a crystalline resin obtained by condensation polymerization of a dicarboxylic acid component containing at least one compound selected from the group consisting of terephthalic acid, 2,6-naphthalene dicarboxylic acid and derivatives thereof in a total amount of at least 50% by mole in the dicarboxylic acid component, and a diol component containing at least one compound selected from the group consisting of 2-methyl-1,3-propanediol, 2,2-dimethyl-1,3-propanediol and derivatives thereof in a total amount of at least 50% by mole in the diol component.

As was previously described, the crystalline resin of the present invention preferably contains at least one compound selected from the group consisting of terephthalic acid, 2,6-naphthalene dicarboxylic acid and derivatives thereof as a dicarboxylic acid component in a total amount of at least 50% by mole in the dicarboxylic acid component. Here, the above-mentioned derivatives refer to derivatives such as those obtained by methyl esterification, ethyl esterification or acid chlorination of terephthalic acid and 2,6-naphthalene dicarboxylic acid that allow the obtaining of a similar resin structure by the above-mentioned condensation polymerization. Specific examples thereof include dimethyl terephthalate, diethyl terephthalate, terephthaloyl dichloride, dimethyl 2,6-naphthalene dicarboxylate, diethyl 2,6-naphthalene dicarboxylate and 2,6-naphthalene dicarboxylic acid dichloride.

As a result of containing a compound selected from the group consisting of terephthalic acid, 2,6-naphthalene dicarboxylic acid and derivatives thereof for the above-mentioned dicarboxylic acid component, the aromatic rings are arranged linearly and the glass transition temperature of the crystalline resin becomes higher, thereby facilitating the occurrence of crystallization. Here, the dicarboxylic acid component used is not limited to the above-mentioned specific compounds provided the aromatic rings are arranged linearly.

In addition, in order to further raise the glass transition temperature of the crystalline resin to further facilitate the occurrence of crystallization, the above-mentioned dicarboxylic acid component more preferably contains at least one compound selected from the group consisting of terephthalic acid, 2,6-naphthalene dicarboxylic acid and derivatives thereof in a total amount of at least 90% by mole in the dicarboxylic acid component.

As was previously described, the crystalline resin of the present invention preferably contains at least one compound selected from the group consisting of 2-methyl-1,3-propanediol, 2,2-dimethyl-1,3-propanediol and derivatives thereof as a diol component in a total amount of at least 50% by mole in the diol component. Here, the above-mentioned derivatives refer to derivatives obtained by esterifying 2-methyl-1,3-propanediol and 2,2-dimethyl-1,3-propanediol that allow the obtaining of a similar resin structure by the above-mentioned condensation polymerization. Specific examples thereof include 2-methyl-1,3-propanediol dimethacrylate and 2,2-dimethyl-1,3-propanediol dimethacrylate.

The melting point of the resulting crystalline resin can be lowered as a result of both 2-methyl-1,3-propanediol and 2,2-dimethyl-1,3-propanediol having a branched methyl group. Among these, in the case of using 2-methyl-1,3-propanediol, the decrease in melting point can be made to be larger, thereby making this more preferable.

In addition, in order to further lower the melting point of the crystalline resin, the diol component more preferably contains at least one compound selected from the group consisting of 2-methyl-1,3-propanediol, 2,2-dimethyl-1,3-propanediol and derivatives thereof in a total amount of at least 90% by mole in the diol component.

As a result of introducing a backbone in the manner of a compound selected from the group consisting of 2-methyl-1,3-propanediol, 2,2-dimethyl-1,3-propanediol and derivatives thereof as a diol component, branching is present that consists of short methyl groups on a rigid main chain and interplanar distance is thought to increase during crystallization. Consequently, in the resulting crystalline resin, the interplanar distance of the crystals contained therein is suitably increased, and the above-mentioned ratio of low diffraction angle components R (%) can be controlled to within a prescribed range. As a result, the melting point of the resulting crystalline resin decreases and low-temperature fixability is thought to be demonstrated in the case of containing in a toner. Here, the diol component used is not limited to the above-mentioned specific compounds provided branching consisting of short methyl groups on a rigid main chain is present.

On the other hand, if only 1,3-propanediol and the like absent of a branching structure is used as a diol component, although packing of the main chain improves and crystallization of the crystalline resin occurs more easily, melting point becomes higher and low-temperature fixability decreases in the case of containing in a toner, and this tends to make it difficult to obtain desired effects. In addition, when only 1,2-butanediol having a large branched portion is used as a diol component, the branched portion thereof is thought to inhibit crystallization and it tends to be difficult for crystallization to occur.

In addition, during production of the crystalline resin of the present invention, other carboxylic acid components and alcohol components may also be used as necessary to a degree that does not impair the above-mentioned physical properties. However, in the case of combining the use of a long-chain aliphatic dicarboxylic acid component having 6 or more carbon atoms or a long-chain diol component having 6 or more carbon atoms, resin mobility increases locally and charging performance tends to decrease. Examples of other carboxylic acid components include carboxylic acids such as oxalic acid, malonic acid, maleic acid, fumaric acid, citraconic acid, itaconic acid, glutaconic acid or succinic acid; alicyclic dicarboxylic acids such as 1,1-cyclopentene dicarboxylic acid, 1,4-cyclohexane dicarboxylic acid, 1,3-cyclohexane dicarboxylic acid or 1,3-adamantane dicarboxylic acid; aromatic dicarboxylic acids such as phthalic acid, isophthalic acid, p-phenylene diacetic acid, m-phenylene diacetic acid, p-phenylene dipropionic acid, m-phenylene dipropionic acid, naphthalene-1,4-dicarboxylic acid or naphthalene-1,5-dicarboxylic acid; and polyvalent carboxylic acids having a valence of 3 or more such as trimellitic acid, pyromellitic acid, naphthalene tricarboxylic acid, naphthalene tetracarboxylic acid, pyrene tricarboxylic acid or pyrene tetracarboxylic acid. However, other monomers are not limited thereto.

Examples of other alcohol components include divalent alcohols such as 1,2-propanediol, 1,3-propanediol, 1,4-butanediol, 1,5-pentanediol, 1,4-butenediol, cyclohexanediol and cyclohexanedimethanol. In addition, examples of alcohols having a valence of 3 or more include glycerol, pentaerythritol, hexamethylolmelamine and hexaethylolmelamine. However, other monomers are not limited thereto.

The weight-average molecular weight (Mw) of the crystalline resin of the present invention as measured by gel permeation chromatography (GPC) is preferably at least 5,000 and not more than 50,000, and more preferably at least 5,000 and not more than 20,000. In the case the weight-average molecular weight (Mw) is less than 5,000, strength as a resin decreases and Tg tends to lower. In addition, in the case the weight-average molecular weight (Mw) exceeds 50,000, since the crystalline resin of the present invention has a rigid structure, viscosity tends to increase when dissolved in an organic solvent and the like during toner production. Consequently, it is difficult for resin deformation to occur even at temperatures equal to or higher than the melting point, and low-temperature fixability as toner tends to decrease.

Furthermore, the above-mentioned weight-average molecular weight (Mw) of the crystalline resin can be easily controlled by various known crystalline resin production conditions.

In addition, the above-mentioned weight-average molecular weight (Mw) of the crystalline resin is measured in the manner indicated below using gel permeation chromatography (GPC).

Special grade 2,6-di-t-butyl-4-methylphenol (BHT) is added to o-dichlorobenzene for gel chromatography to a concentration of 0.10 wt/vol % and dissolved at room temperature. Crystalline resin and the above-mentioned o-dichlorobenzene to which BHT has been added are placed in a sample bottle followed by heating on a hot plate set to 150° C. to dissolve the crystalline resin. Once the crystalline resin has dissolved, it is placed in a preheated filter unit and installed in the main device. The solution that has been passed through the filter unit is referred to as a GPC sample. Furthermore, the sample solution is adjusted to a concentration of about 0.15% by mass. Measurement is then carried out using this sample solution under the conditions indicated below.

Instrument: HLC-8121GPC/HT (Tosoh Corporation)
Detector: High-temperature RI
Column: TSKgel GMHHR-H HT, 2 in series (Tosoh Corporation)
Temperature: 135.0° C.
Solvent: o-dichlorobenzene for gel chromatography (with 0.10 wt/vol % of BHT)
Flow rate: 1.0 ml/min
Injection volume: 0.4 ml In calculating the molecular weight of the crystalline resin, a molecular weight calibration curve is used that was prepared using standard polystyrene resins (e.g., trade name "TSK Standard Polystyrene F-850, F-450, F-288, F-128, F-80, F-40, F-20, F-10, F-4, F-2, F-1, A-5000, A-2500, A-1000, A-500"; Tosoh Corporation).

In addition, the weight-average molecular weight (Mw) of the crystalline resin of the present invention contained in toner is determined by isolating the crystalline resin component from the resin contained in the toner, and measuring the weight-average molecular weight (Mw) according to the above-mentioned method. An example of a method for isolating the crystalline resin component includes isolating the crystalline resin component as residue by Soxhlet extraction of the toner with ethyl acetate solvent. The molecular structure of the extraction residue can be confirmed to be that of crystalline resin by measuring the NMR spectrum thereof.

There may be cases in which it is difficult for crystallization of the crystalline resin of the present invention to occur due to the high glass transition temperature thereof.

Therefore, in the case of desiring to more reliably carry out crystallization of a crystalline resin obtained by condensation polymerization of monomers that compose the resin, or in the case crystallization of the crystalline resin has been judged to be inadequate, crystallization treatment is carried out either after condensation polymerization of the monomers that compose the resin or during the toner production process.

There are no particular limitations on the method used for crystallization treatment, and a known method can be used. Specific examples of such methods are as follows:

(1) a method including heating and dissolving a resin obtained by condensation polymerization of monomers in an organic solvent followed by lowering the temperature;

(2) a method including dissolving a resin obtained by condensation polymerization of monomers in an organic solvent, and removing the organic solvent from the resulting resin solution; and (3) a method including combining the methods described in (1) and (2).

Although the reason why resin crystallization is promoted by these methods is uncertain, it is thought that dissolution of the resin in an organic solvent may mimic reduction of the glass transition temperature, resulting in facilitation of crystallization.

Examples of organic solvents used at that time include toluene, xylene, acetone, tetrahydrofuran, ethyl acetate, propyl acetate, butyl acetate and supercritical $CO_2$. In particular, organic solvents having a solubility parameter (SP) value of 8 to 9 tend to promote resin crystallization.

In addition, specific examples of the method described in (1) above are indicated below.

(i) A resin obtained by condensation polymerization of monomers is added to an organic solvent followed by heating to about 60° C. to 100° C. to dissolve the resin in the organic solvent and prepare a resin solution.

(ii) Subsequently, the resulting resin solution is gradually cooled to 40° C. or lower, and preferably to about room temperature (for example, about 25° C.), at the rate of about 1° C./hr to 50° C./hr to cause the resin to precipitate. On the other hand, specific examples of the method described in (2) above are indicated below.

(i) A resin obtained by condensation polymerization of monomers is dissolved in an organic solvent to prepare a resin solution.

(ii) The resulting resin solution is held at a temperature of about 60° C. to 100° C. for about 15 minutes to 1 hour.

(iii) Subsequently, the organic solvent is removed over the course of about 2 hours to 120 hours at a temperature of about 4° C. to 30° C. and pressure of about 250 mmHg to 760 mmHg to obtain a resin.

On the other hand, since the crystalline resin of the present invention has the previously described characteristics, after the crystalline resin of the present invention has been crystallized in an organic solvent, crystallization stops when the organic solvent is removed. Consequently, it has the characteristic of being resistant to the occurrence of changes over time, such as the progression of crystallization, during storage as a toner.

In particular, the crystalline resin of the present invention is resistant to changes over time if an amount of heat of fusion as measured by a differential scanning calorimeter (DSC) satisfies the following expression (3), thereby making this preferable:

$$H2/H1 \leq 0.1 \quad (3)$$

wherein, H1 (J/g) represents an amount of heat of fusion after a first temperature rise from 25° C. to 200° C. at a ramp rate of 10° C./min, while H2 (J/g) represents an amount of heat of fusion after a second temperature rise from 25° C. to 200° C. at a ramp rate of 10° C./min carried out after cooling to 25° C. at a cooling rate of 1° C./min after the first temperature rise and holding for 24 hours at 25° C.).

Here, H1 indicates degree of crystallinity in the initial state, while H2 indicates the degree to which the crystalline resin crystallizes in the case of having been cooled gradually in an air atmosphere after being melted. Thus, [H2/H1] refers to the extent to which the crystalline resin returns to its initial crystalline state in an air atmosphere. In other words, in the case [H2/H1] is small, crystals are unlikely to undergo a change in an air atmosphere and are resistant to changes over time during storage.

Furthermore, the amount of heat of fusion of the crystalline resin of the present invention (H1 and H2) can be measured in compliance with ASTM D3418-82 using a differential scanning calorimeter (DSC822/EK90, Mettler-Toledo). More specifically, 0.02 g of sample is weighed in an aluminum pan followed by raising the temperature from 25° C. to 200° C. at a ramp rate of 10° C./min and measuring the amount of heat of fusion H1 (J/g) at that time. Continuing, after cooling to 25° C. at a cooling rate of 1° C./min, the temperature is held at 25° C. for 24 hours followed by raising the temperature a second time from 25° C. to 200° C. at a ramp rate of 10° C./min and measuring the amount of heat of fusion H2 (J/g) at that time. Here, in the temperature range where an endothermic peak appears, the amount of endothermic energy calculated from the area surrounded by the differential scanning calorimetry curve having an endothermic peak obtained when the temperature was raised the first time and the baseline of the differential scanning calorimetry curve is defined as the amount of heat of fusion H1 (J/g). On the other hand, the amount of endothermic energy calculated from the area surrounded by the differential scanning calorimetry curve having an endothermic peak obtained when the temperature was raised a second time and the baseline of the differential scanning calorimetry curve is defined as the amount of heat of fusion H2 (J/g).

The above-mentioned [H2/H1] can be controlled by, for example, the constituent components of the crystalline resin. As a specific example thereof, the above-mentioned range can be controlled by containing for the diol component a diol having a branched structure in the manner of a compound selected from the group consisting of 2-methyl-1,3-propanediol, 2,2-dimethyl-1,3-propanediol and derivatives thereof.

In addition, the amount of heat of fusion (H1 and H2) of the crystalline resin of the present invention contained in a toner can be determined by measuring the toner directly using the above-mentioned method. At that time, an endothermic peak attributable to wax present in the toner may be observed. The endothermic peak attributable to wax can be discriminated from the endothermic peak attributable to the crystalline resin by extracting the wax from the toner by Soxhlet extraction using a hexane solvent, carrying out differential scanning calorimetry on the wax only according to the above-mentioned method, and comparing the resulting endothermic peak with the endothermic peak of the toner.

The toner of the present invention contains the crystalline polyester resin for toner of the present invention.

The toner of the present invention can be produced by a known production method such as pulverizing, suspension polymerization, emulsification aggregation or dissolution suspension, and the production method is not particularly limited. However, among these production methods, the toner of the present invention is preferably produced by the dissolution suspension method from the viewpoint of controlling crystallinity of the crystalline resin of the present invention.

The following indicates an example of a toner production method using the dissolution suspension method.

The dissolution suspension method is a method for producing toner by dissolving or dispersing a colorant and release agent and the like in an organic solvent, dispersing the resulting solution or dispersion in a poor solvent such as water approximately at the size of toner particles, and distilling off the organic solvent while in that state. In the dissolution suspension method, toner is produced by going through a resin dissolving step, a granulating step, a solvent removal step, and a washing and drying step.

An example of a production method of the toner of the present invention comprises a step of obtaining a resin composition by at least dissolving the crystalline polyester resin for toner of the present invention or resin prior to crystallization treatment of the crystalline polyester resin for toner of the present invention (to be referred to as the pre-crystallization treatment resin) in an organic solvent (resin dissolving step), a step of obtaining a dispersion by dispersing the resulting resin composition in an aqueous medium (granulating step), and a step of removing the above-mentioned organic solvent from the resulting dispersion (solvent removal step).

<Resin Dissolving Step>

The above-mentioned resin dissolving step is a step of producing a resin composition by heating and dissolving the crystalline resin of the present invention or a resin prior to crystallization treatment of the crystalline resin of the present invention in an organic solvent to prepare a resin solution, and dissolving or dispersing another resin, colorant or release agent and the like in the resin solution as necessary.

A preferable example of an embodiment for obtaining the resin composition includes, but is not limited to, dissolving, in an organic solvent, a polyester resin obtained by condensation polymerization of a dicarboxylic acid component containing at least one compound selected from the group consisting of terephthalic acid, 2,6-naphthalene dicarboxylic acid and derivatives thereof, and a diol component containing at least one compound selected from the group consisting of 2-methyl-1,3-propanediol, 2,2-dimethyl-1,3-propanediol and derivatives thereof.

Any arbitrary solvent can be used for the organic solvent used provided it is an organic solvent that dissolves the resin. Specific examples thereof include toluene, xylene, chloroform, methylene chloride and ethyl acetate. Furthermore, in the present invention, toluene and ethyl acetate are used preferably from the viewpoints of promoting crystallization of the crystalline resin and facilitating removal of solvent. In addition, if a solvent such as toluene having high efficacy for promoting crystallization is used alone, the resulting toner easily adopts a hollow structure and strength tends to decrease. Consequently, decreases in strength can be prevented by mixing a solvent having low efficacy for promoting crystallization such as chloroform with a solvent having high efficacy for promoting crystallization such toluene. As a result of combining the use of a solvent having high efficacy for promoting crystallization with a solvent having low efficacy for promoting crystallization, the resulting toner has a solid structure and strength can be improved. As a result, there is less likelihood of the toner being fractured during use in a copying machine and the like.

Promotion of crystallization of an organic solvent can be assessed based on whether or not the crystalline resin precipitates by dissolving the crystalline resin in an organic solvent at a concentration of 70% by mass while heating as necessary, cooling to 25° C., and allowing to stand for 24 hours. The crystalline resin precipitates in the organic solvent in the case of having high efficacy for promoting crystallization, while precipitation does not occur in the case of having low efficacy for promoting crystallization.

In the present invention, the above-mentioned organic solvent at least comprises an organic solvent A (solvent having high efficacy for promoting crystallization) and an organic solvent B (solvent having low efficacy for promoting crystallization), and preferably satisfies the following conditions (1) and (2):

(1) the organic solvent A causes the polyester resin to precipitate as crystalline resin in the case of dissolving the polyester resin dissolved in the organic solvent in the resin dissolving step at a concentration of 70% by mass and allowing to stand for 24 hours at 25° C.; and (2) the organic solvent B does not cause the polyester resin to precipitate as crystalline resin in the case of dissolving the polyester resin dissolved in the organic solvent in the resin dissolving step at a concentration of 70% by mass and allowing to stand for 24 hours at 25° C.

Here, the mixing ratio of the organic solvent A and the organic solvent B (mass ratio) is more preferably 10/1 to 1/10 from the viewpoint of realizing both promotion of toner crystallization and prevention of decreases in toner strength.

Although there are no particular limitations on the amount of the above-mentioned organic solvents used, the amount is that at which the resin composition has a viscosity that enables it to be dispersed and granulated in an aqueous medium. More specifically, the mass ratio of the resin composition containing the crystalline resin of the present invention, other resin, colorant and release agent and the like to the organic solvents is preferably 10/90 to 50/50 from the viewpoint of granulating properties to be subsequently described and production efficiency of the toner.

In the present invention, although other resins can be used as toner binding resin in addition to the crystalline resin of the present invention, the crystalline resin of the present invention is preferably contained at not less than 10% by mass and not more than 100% by mass, and more preferably at not less than 30% by mass and not more than 100% by mass, based on total toner mass.

In addition, in order to efficiently demonstrate the effects of the crystalline resin of the present invention by combining the use of another resin, the crystalline resin of the present invention is preferably designed so that it is present on the outside of the produced toner using a known method. For example, in the case of the dissolution suspension method, by using the crystalline resin of the present invention for the binder resin of the toner, selecting a resin for use as another resin that has a lower hydrophilicity than that of the crystalline resin of the present invention, or rendering the crystalline resin of the present invention to have higher hydrophilicity than another resin, the crystalline resin of the present invention can be made to be present on the outside of the produced toner. Examples of other resins that can be used include conventionally known thermoplastic binder resins, specific examples of which include styrene acrylate-based resins, epoxy resins, polyester resins, polyurethane resins, polyamide resins, cellulose resins and polyether resins.

On the other hand, the colorant and release agent are not required to be dissolved in an organic solvent, but may also be dispersed. In the case of using the colorant and release agent in a dispersed state, they are preferably dispersed using a disperser such as a bead mill.

There are no particular limitations on colorants able to be used, and examples thereof include known organic pigments or oil dyes, carbon black and magnetic powder. Examples of cyan colorants include copper phthalocyanine compounds and derivatives thereof, anthraquinone compounds and basic dye lake compounds. Examples of magenta colorants include condensed azo compounds, diketopyrrolopyrrole compounds, anthraquinone compounds, quinacridone compounds, basic dye lake compounds, naphthol compounds, benzimidazolone compounds, thioindigo compounds and perylene compounds.

Examples of yellow colorants include compounds represented by condensed azo compounds, isoindolinone compounds, anthraquinone compounds, azo metal complexes, methine compounds and allylamide compounds.

Examples of black colorants include carbon black, magnetic powder, and colorants obtained by mixing the above-mentioned yellow, magenta and cyan colorants to obtain black color. These colorants can be used alone or mixed, and can also be used in the form of a solid solution. The colorant used in the present invention is selected based on hue angle, chroma, lightness, lightfastness, OHP transparency and dispersibility in toner.

In the present invention, the content of cyan, magenta, yellow or black colorant is preferably from at least 1 part by mass to less than 20 parts by mass based on 100 parts by mass of the resin that composes the toner.

On the other hand, there are no particular limitations on release agents able to be used, and examples thereof include low molecular weight polyolefins such as polyethylene; silicones having a melting point (softening point) due to heating; fatty acid amides such as oleic acid amide, erucic acid amide, ricinoleic acid amide or stearic acid amide; ester waxes such as stearyl stearate; plant-based waxes such as carnauba wax, rice wax, candelilla wax, Japan wax or jojoba oil; animal-based waxes such as beeswax; mineral and petroleum-based waxes such as montan wax, ozokerite, ceresine, paraffin wax, microcrystalline wax, Fischer-Tropsch wax or ester wax; and modified forms thereof.

The above-mentioned release agent preferably has a melting point of 150° C. or lower, more preferably 40.0° C. to 130.0° C., and particularly preferably 40° C. to 110° C. In addition, the above-mentioned release agent is preferably used at 1 part by mass to 20 parts by mass based on 100 parts by mass of the resin that composes the toner.

<Granulating Step>

The above-mentioned granulating step is a step of preparing a dispersion (granulated substance) by dispersing the resulting resin composition in an aqueous medium to a prescribed toner particle diameter using a dispersing agent. Water is mainly used for the aqueous medium. In addition, the aqueous medium preferably contains a monovalent metal salt at not less than 1% by mass and not more than 30% by mass. As a result of containing a monovalent metal salt, diffusion of the organic solvent in the resin composition in the aqueous medium is inhibited, thereby increasing the crystallinity of the resin contained in the resulting toner particles, facilitating the obtaining of favorable toner blocking property, and facilitating the obtaining of favorable toner particle size distribution.

Examples of the above-mentioned monovalent metal salt include sodium chloride, potassium chloride, lithium chloride and potassium bromide, and among these, sodium chloride and potassium chloride are preferable.

In addition, the mixing ratio of the aqueous medium to the resin composition (mass ratio) is preferably such that aqueous medium/resin composition=90/10 to 50/50.

Although there are no particular limitations on the above-mentioned dispersing agent, cationic, anionic and nonionic surfactants are used as organic dispersing agents, and anionic surfactants are used preferably. Examples thereof include sodium alkylbenzene sulfonate, sodium α-olefin sulfonate, sodium alkyl sulfonate and sodium alkyl diphenyl ether disulfonate. On the other hand, examples of inorganic dispersing agents include tricalcium phosphate, hydroxyapatite, calcium carbonate, titanium oxide and silica powder.

An inorganic dispersing agent in the form of calcium triphosphate is used preferably in the present invention. The reason for this is that calcium triphosphate has a minimal detrimental effect on granulating properties, the stability thereof and on the properties of the resulting toner. The amount of dispersing agent added is determined corresponding to the particle diameter of the granulated substance, and increasing the added amount of dispersing agent results in a decrease in particle diameter. Consequently, although differing according to the desired particle diameter, the amount of dispersing agent added is preferably within a range of 0.1% by mass to 15% by mass based on the resin composition. If the added amount is less than 0.1% by mass, coarse granules are formed easily, while if the added amount exceeds 15% by mass, unwanted fine particles are formed easily. In addition, when preparing a dispersion of the resin composition in an aqueous medium, it is preferably prepared under high-speed shearing. The dispersion of the resin composition dispersed in an aqueous medium is preferably granulated to a weight-average particle diameter of 10 μm or less and more preferably granulated to about 4 μm to 9 μm.

Examples of devices for imparting high-speed shearing include various types of high-speed dispersers and ultrasonic dispersers.

On the other hand, the above-mentioned weight-average particle diameter of the dispersion can be measured with a particle size distribution analyzer using the Coulter method (Coulter Multisizer III, Coulter Inc.).

<Solvent Removal Step>

The solvent removal step is a step of removing organic solvent from the resulting dispersion. Organic solvent is preferably removed slowly while stirring. In addition, the removal rate of the organic solvent can be controlled by heating or reducing pressure as necessary.

In a production method such as the dissolution suspension method for forming a dispersion in an aqueous medium, since the previously described crystallization treatment is included in the production steps thereof, crystallization of the crystalline resin of the present invention can be carried out more reliably.

For example, the organic solvent is removed after precipitating and crystallizing the crystalline resin by holding the temperature of the aqueous medium at about 60° C. to 100° C. in stage prior to the solvent removal step, namely in the granulating step, and then cooling to a temperature of 40° C. or lower, and preferably to room temperature (such as a temperature of about 25° C.) at a cooling rate of about 1° C./hr to 50° C./hr while stirring after the granulating step and before the solvent removal step or during the solvent removal step. In addition, a preferable technique for promoting crystallization of the crystalline resin of the present invention includes allowing an adequate amount of time for dissolving the crystalline resin of the present invention in an organic solvent and slowing the solvent removal rate. More specifically, an example of such a method includes removing the organic solvent from the resulting dispersion over the course of about 2 hours to 120 hours, preferably over the course of 24 hours or more and more preferably over the course of 72 hours or more, at a temperature of about 4° C. to 30° C. and pressure of about 250 mmHg to 760 mmHg.

<Washing and Drying Step>

A washing and drying step may be carried out after the above-mentioned solvent removal step by washing several times with water and the like followed by filtering and drying the toner particles. In addition, When the dispersing agent is used which dissolves under acidic conditions such as tricalcium phosphate, the toner particles are preferably rinsed with water after first washing with hydrochloric acid and the like. The dispersing agent used for granulation is removed as a result of carrying out washing, thereby making it possible to improve toner properties. After washing, toner is obtained by filtering and drying. Inorganic particles such as silica, alumina, titania or calcium carbonate particles, or resin particles such as vinyl-based resin, polyester resin or silicone resin particles, may be added to the resulting toner as necessary by applying shearing force in a dry state. These inorganic particles and resin particles function as external additives such as auxiliary agents for charging, auxiliary agents for flowability or auxiliary agents for cleaning.

The amount of the toner of the present invention remaining on a sieve having a mesh size of 75 μm after allowing to stand undisturbed for 3 days at 40° C. and sifting with the sieve for 120 seconds at a shaking width of 1 mm is preferably 10% or less. In the case the crystalline resin for toner of the present invention is present on the outside of the toner, it becomes easier to satisfy the above-mentioned conditions and blocking property becomes even more favorable.

EXAMPLES

Although the following provides a more detailed explanation of the present invention using examples and comparative examples, these examples and comparative examples do not limit the present invention in any way.

Production of Resin

Example 1

Production of Polyester Resin 1

| Dicarboxylic acid component: | |
|---|---|
| Dimethyl terephthalate | 100 parts by mole |
| Diol component: | |
| 2-methyl-1,3-propanediol | 200 parts by mole |

The above-mentioned monomer components were placed in an adequately heated and dried two-mouth flask, 0.05 parts by mass of tetraisopropyl orthotitanate were added to 100 parts by mass of the resulting mixture, and after introducing nitrogen gas into the flask and raising the temperature while maintaining an inert atmosphere, a condensation polymerization reaction was carried out at 230° C. followed by reducing the pressure and raising the temperature to 250° C. to synthesize a resin (pre-crystallization treatment resin 1).

The resulting resin was subjected to crystallization treatment by adding 40 g of the resulting resin to a beaker containing 160 g of toluene and heating to 90° C. to dissolve the resin, followed by gradually cooling to 25° C. over the course of 6 hours to precipitate resin. The precipitated resin was then filtered and dried to obtain polyester resin 1 (weight-average molecular weight [Mw]: 9,500, glass transition temperature [Tg]: 42° C., melting point [Mp]: 81° C.)

Example 2

Production of Polyester Resin 2

Polyester resin 2 was obtained in the same manner as Example 1 with the exception of changing the amount of tetraisopropyl orthotitanate added to 0.03 parts by mass (Mw: 6,400, glass transition temperature: 30° C., melting point: 79° C.)

Example 3

Production of Polyester Resin 3

Polyester resin 3 was obtained in the same manner as Example 1 with the exception of changing the amount of tetraisopropyl orthotitanate added to 0.10 parts by mass (Mw: 42,000, glass transition temperature: 50° C., melting point: 83° C.)

Example 4

Production of Polyester Resin 4

| Dicarboxylic acid component: | |
|---|---|
| Dimethyl terephthalate | 100 parts by mole |
| Diol component: | |
| 2-methyl-1,3-propanediol | 100 parts by mole |
| 1,4-butanediol | 100 parts by mole |

Polyester resin 4 was obtained in the same manner as Example 1 with the exception of changing the monomer components as indicated above (Mw: 17,000, glass transition temperature: 28° C., melting point: 107° C.)

Example 5

Production of Polyester Resin 5

| Dicarboxylic acid component: | |
|---|---|
| Dimethyl terephthalate | 100 parts by mole |
| Diol component: | |
| 2-methyl-1,3-propanediol | 150 parts by mole |
| 1,4-butanediol | 50 parts by mole |

Polyester resin 5 was obtained in the same manner as Example 1 with the exception of changing the monomer components as indicated above (Mw: 8,900, glass transition temperature: 34° C., melting point: 79° C.)

Example 6

Production of Polyester Resin 6

| Dicarboxylic acid component: | |
|---|---|
| Dimethyl terephthalate | 100 parts by mole |
| Diol component: | |
| 2-methyl-1,3-propanediol | 150 parts by mole |
| 1,3-propanediol | 50 parts by mole |

Polyester resin 6 was obtained in the same manner as Example 1 with the exception of changing the monomer components as indicated above (Mw: 10,000, glass transition temperature: 38° C., melting point: 106° C.)

Example 7

Production of Polyester Resin 7

| Dicarboxylic acid component: | |
|---|---|
| Dimethyl terephthalate | 100 parts by mole |
| Diol component: | |
| 2,2-dimethyl-1,3-propanediol | 200 parts by mole |

Polyester resin 7 was obtained in the same manner as Example 1 with the exception of changing the monomer components as indicated above (Mw: 19,000, glass transition temperature: 57° C., melting point: 151° C.)

Example 8

Production of Polyester Resin 8

| Dicarboxylic acid component: | |
|---|---|
| 2,6-naphthalene dicarboxylic acid | 100 parts by mole |
| Diol component: | |
| 2-methyl-1,3-propanediol | 200 parts by mole |

Polyester resin 8 was obtained in the same manner as Example 1 with the exception of changing the monomer components as indicated above (Mw: 7,900, glass transition temperature: 68° C., melting point: 154° C.)

Comparative Example 1

Production of Polyester Resin 9

| Dicarboxylic acid component: | |
|---|---|
| Decane dicarboxylic acid | 100 parts by mole |
| Diol component: | |
| 1,6-hexanediol | 200 parts by mole |

The above-mentioned monomer components were placed in an adequately heated and dried two-mouth flask, 0.05 parts by mass of tetraisopropyl orthotitanate were added to 100 parts by mass of the resulting mixture, and after introducing nitrogen gas into the flask and raising the temperature while maintaining an inert atmosphere, a condensation polymerization reaction was carried out at 230° C. followed by reducing the pressure and raising the temperature to 250° C. to polymerize a resin. The resulting resin was dried to obtain polyester resin 9 (Mw: 27,000, glass transition temperature: −62° C., melting point: 67° C.)

Comparative Example 2

Production of Polyester Resin 10

| Dicarboxylic acid component: | |
|---|---|
| Decane dicarboxylic acid | 100 parts by mole |
| Diol component: | |
| 1,10-decanediol | 200 parts by mole |

Polyester resin 10 was obtained in the same manner as Comparative Example 1 with the exception of changing the monomer components as indicated above (Mw: 37,000, glass transition temperature: −57° C., melting point: 77° C.)

Comparative Example 3

Production of Polyester Resin 11

| Dicarboxylic acid component: | |
|---|---|
| Dimethyl terephthalate | 100 parts by mole |
| Diol component: | |
| 1,3-propanediol | 200 parts by mole |

Polyester resin 11 was obtained in the same manner as Comparative Example 1 with the exception of changing the monomer components as indicated above (Mw: 9,100, glass transition temperature: 38° C., melting point: 227° C.)

Comparative Example 4

Production of Polyester Resin 12

| Dicarboxylic acid component: | |
|---|---|
| Dimethyl terephthalate | 100 parts by mole |
| Diol component: | |
| 1,3-propanediol | 200 parts by mole |

Polyester resin 12 was obtained in the same manner as Example 1 with the exception of changing the monomer components as indicated above (Mw: 9,100, glass transition temperature: 38° C., melting point: 230° C.)

Comparative Example 5

Production of Polyester Resin 13

| Dicarboxylic acid component: | |
|---|---|
| Dimethyl terephthalate | 100 parts by mole |
| Diol component: | |
| 1,2-ethylene glycol | 200 parts by mole |

Polyester resin 13 was obtained in the same manner as Comparative Example 1 with the exception of changing the monomer components as indicated above (Mw: 15,000, glass transition temperature: 65° C., melting point: 243° C.)

Comparative Example 6

Production of Polyester Resin 14

| Dicarboxylic acid component: | |
|---|---|
| Dimethyl terephthalate | 100 parts by mole |
| Diol component: | |
| 2-methyl-1,3-propanediol | 200 parts by mole |

Polyester resin 14 was obtained in the same manner as Comparative Example 1 with the exception of changing the monomer components as indicated above (Mw: 9,500, glass transition temperature: 42° C., melting point: none).

Comparative Example 7

Production of Polyester Resin 15

| Dicarboxylic acid component: | |
|---|---|
| Dimethyl terephthalate | 100 parts by mole |
| Diol component: | |
| 2,2-dimethyl-1,3-propanediol | 200 parts by mole |

Polyester resin 15 was obtained in the same manner as Comparative Example 1 with the exception of changing the monomer components as indicated above (Mw: 7,100, glass transition temperature: 58° C., melting point: none).

Comparative Example 8

Production of Polyester Resin 16

| Dicarboxylic acid component: | |
|---|---|
| 2,6-naphthalene dicarboxylic acid | 100 parts by mole |
| Diol component: | |
| 2-methyl-1,3-propanediol | 200 parts by mole |

Polyester resin 16 was obtained in the same manner as Comparative Example 1 with the exception of changing the monomer components as indicated above (Mw: 7,900, glass transition temperature: 68° C., melting point: none).

Comparative Example 9

Production of Polyester Resin 17

| Dicarboxylic acid component: | |
|---|---|
| Dimethyl terephthalate | 100 parts by mole |
| Diol component: | |
| 1,3-butanediol | 200 parts by mole |

Polyester resin 17 was obtained in the same manner as Example 1 with the exception of changing the monomer components as indicated above (Mw: 6,400, glass transition temperature: 30° C., melting point: none).

Comparative Example 10

Production of Polyester Resin 18

| Dicarboxylic acid component: | |
|---|---|
| Dimethyl terephthalate | 100 parts by mole |
| Diol component: | |
| 1,2-propanediol | 200 parts by mole |

Polyester resin 18 was obtained in the same manner as Example 1 with the exception of changing the monomer components as indicated above (Mw: 8,900, glass transition temperature: 73° C., melting point: none).

Comparative Example 11

Production of Polyester Resin 19

| Dicarboxylic acid component: | |
|---|---|
| Dimethyl terephthalate | 100 parts by mole |
| Diol component: | |
| 1,2-butanediol | 200 parts by mole |

Polyester resin 19 was obtained in the same manner as Example 1 with the exception of changing the monomer components as indicated above (Mw: 7,200, glass transition temperature: 58° C., melting point: none).

Comparative Example 12

Production of Polyester Resin 20

| Dicarboxylic acid component: | |
|---|---|
| Terephthalic acid | 80 parts by mole |
| Dodecyl succinic acid | 20 parts by mole |
| Diol component: | |
| Bisphenol A-ethylene oxide (EO) 2 mole adduct | 33 parts by mole |
| Bisphenol A-propylene oxide (PO) 2 mole adduct | 67 parts by mole |

Polyester resin 20 was obtained in the same manner as Comparative Example 1 with the exception of changing the monomer components as indicated above (Mw: 14,000, glass transition temperature: 56° C., melting point: none).

Comparative Example 13

Production of Polyester Resin 21

| Dicarboxylic acid component: | |
|---|---|
| Terephthalic acid | 80 parts by mole |
| Dodecyl succinic acid | 20 parts by mole |
| Diol component: | |
| Bisphenol A-ethylene oxide (EO) 2 mole adduct | 33 parts by mole |
| Bisphenol A-propylene oxide (PO) 2 mole adduct | 67 parts by mole |

Polyester resin 21 was obtained in the same manner as Example 1 with the exception of changing the monomer components as indicated above (Mw: 14,000, glass transition temperature: 56° C., melting point: none).

The physical properties of the resulting polyester resins are shown in Table 1.

<Evaluation of Polyester Resins>
(Evaluation of Melting Point)

The melting points of the resulting polyester resins were measured according to the previously described method and evaluated based on the criteria indicated below. The evaluation results are shown in Table 1.

(Evaluation Criteria)
A: Melting point of 60° C. to lower than 100° C.
B: Melting point of 100° C. to 125° C.
C: Melting point of higher than 125° C. to less than 180° C.
D: Melting point of 180° C. or higher or no melting point (Evaluation of Charge Retention Rate)

0.01 g of the resulting polyester resins (samples) were weighed in an aluminum pan and charged to −600 V using a scorotron charger. Continuing, the behavior of changes in surface potential was measured for 30 minutes using a surface electrometer (Model 347, Trek Japan) in an atmosphere at a temperature of 25° C. and humidity of 50% RH. The measurement results were substituted into the following equation to calculate charge retention rate, and charge retention rate was evaluated based on the criteria indicated below. The evaluation results are shown in Table 1.

Charge retention rate after 30 minutes (%)=([surface potential after 30 minutes]/[initial surface potential])×100

(Evaluation Criteria)
A: Charge retention rate after 30 min of 90% or more
B: Charge retention rate after 30 min of less than 90% to 50% or more
C: Charge retention rate after 30 min of less than 50%

TABLE 1

| | Resin | Dicarboxylic acid | Diol | Crystallization treatment | Crystallinity |
|---|---|---|---|---|---|
| Example | | | | | |
| 1 | 1 | Dimethyl terephthalate | 2-methyl-1,3-propanediol | Yes | Yes |
| 2 | 2 | Dimethyl terephthalate | 2-methyl-1,3-propanediol | Yes | Yes |
| 3 | 3 | Dimethyl terephthalate | 2-methyl-1,3-propanediol | Yes | Yes |
| 4 | 4 | Dimethyl terephthalate | 2-methyl-1,3-propanediol 1,4-butanediol | Yes | Yes |
| 5 | 5 | Dimethyl terephthalate | 2-methyl-1,3-propanediol 1,4-butanediol | Yes | Yes |
| 6 | 6 | Dimethyl terephthalate | 2-methyl-1,3-propanediol 1,3-propanediol | Yes | Yes |
| 7 | 7 | Dimethyl terephthalate | 2,2-dimethyl-1,3-propanediol | Yes | Yes |
| 8 | 8 | 2,6-naphthalene dicarboxylic acid | 2-methyl-1,3-propanediol | Yes | Yes |
| Comparative Example | | | | | |
| 1 | 9 | Decane dicarboxylic acid | 1,6-hexanediol | No | Yes |
| 2 | 10 | Decane dicarboxylic acid | 1,10-decanediol | No | Yes |
| 3 | 11 | Dimethyl terephthalate | 1,3-propanediol | No | Yes |
| 4 | 12 | Dimethyl terephthalate | 1,3-propanediol | Yes | Yes |
| 5 | 13 | Dimethyl terephthalate | 1,2-ethylene glycol | No | Yes |
| 6 | 14 | Dimethyl terephthalate | 2-methyl-1,3-propanediol | No | No |
| 7 | 15 | Dimethyl terephthalate | 2,2-dimethyl-1,3-propanediol | No | No |
| 8 | 16 | 2,6-naphthalene dicarboxylic acid | 2-methyl-1,3-propanediol | No | No |
| 9 | 17 | Dimethyl terephthalate | 1,3-butanediol | Yes | No |
| 10 | 18 | Dimethyl terephthalate | 1,2-propanediol | Yes | No |
| 11 | 19 | Dimethyl terephthalate | 1,2-butanediol | Yes | No |
| 12 | 20 | Terephthalic acid Dodecyl succinate | BPA-EO adduct BPA-PO adduct | No | No |
| 13 | 21 | Terephthalic acid Dodecyl succinate | BPA-EO adduct BPA-PO adduct | Yes | No |

| | Tg (° C.) | Melting point (° C.) | (Tg + 273)/ (Mp + 273) | Degree of crystallinity (%) | Ratio of low diffraction angle components R (%) | H1 | H2 | H2/H1 | Charge retention rate | Melting point |
|---|---|---|---|---|---|---|---|---|---|---|
| Example | | | | | | | | | | |
| 1 | 42 | 81 | 0.89 | 29 | 49 | 29 | 0 | 0 | A | A |
| 2 | 30 | 79 | 0.86 | 25 | 37 | 26 | 0 | 0 | B | A |

TABLE 1-continued

|  |  |  |  |  |  |  |  |  |  |  |
|---|---|---|---|---|---|---|---|---|---|---|
| 3 | 50 | 83 | 0.91 | 23 | 32 | 21 | 0 | 0 | A | A |
| 4 | 28 | 107 | 0.79 | 15 | 35 | 25 | 0 | 0 | B | B |
| 5 | 34 | 79 | 0.87 | 9 | 31 | 18 | 0 | 0 | A | A |
| 6 | 38 | 106 | 0.82 | 24 | 57 | 19 | 0 | 0 | B | B |
| 7 | 57 | 151 | 0.78 | 24 | 33 | 24 | 0 | 0 | A | C |
| 8 | 68 | 154 | 0.80 | 25 | 56 | 30 | 0 | 0 | A | C |
| Comparative Example |  |  |  |  |  |  |  |  |  |  |
| 1 | −62 | 67 | 0.66 | 56 | 3 | 97 | 78 | 0.80 | C | A |
| 2 | −57 | 77 | 0.64 | 52 | 3 | 132 | 112 | 0.85 | C | A |
| 3 | 38 | 227 | 0.62 | 30 | 29 | 68 | 66 | 0.97 | B | D |
| 4 | 38 | 230 | 0.62 | 30 | 29 | 71 | 66 | 0.93 | B | D |
| 5 | 65 | 243 | 0.66 | 41 | 15 | 44 | 41 | 0.93 | A | D |
| 6 | 42 | — | — | — | — | — | — | — | A | D |
| 7 | 58 | — | — | — | — | — | — | — | A | D |
| 8 | 68 | — | — | — | — | — | — | — | A | D |
| 9 | 30 | — | — | — | — | — | — | — | B | D |
| 10 | 73 | — | — | — | — | — | — | — | A | D |
| 11 | 58 | — | — | — | — | — | — | — | A | D |
| 12 | 56 | — | — | — | — | — | — | — | A | D |
| 13 | 56 | — | — | — | — | — | — | — | A | D |

Example 9

Production of Toner 1

11.7 parts by mass of trisodium phosphate dodecahydrate (Wako Pure Chemical Industries) and 1200 parts by mass of ion exchange water were added to a beaker placed in a water bath followed by dissolving the trisodium phosphate dodecahydrate. Continuing, the temperature of the water bath was raised to 60° C. Once the temperature had reached 60° C., an aqueous solution containing 5.15 parts by mass of calcium chloride (Kishida Chemical) dissolved in 100 parts by mass of ion exchange water was added. The solution was stirred for 30 minutes after addition to obtain an aqueous medium containing tricalcium phosphate as dispersing agent.

Next, the following materials:

| | |
|---|---|
| pre-crystallization treatment resin 1 | 40 parts by mass |
| colorant (cyan pigment: Pigment Blue 15:3 Dainichiseika Color & Chemicals) | 2 parts by mass |
| release agent (behenyl behenate, melting point: 75° C.) | 4 parts by mass |
| toluene | 160 parts by mass | were mixed, followed by dissolving and dispersing by heating to 80° C. while stirring to prepare a resin composition. On the other hand, 600 parts by mass of the above-mentioned aqueous medium were heated to 80° C. while stirring with a Clearmix disperser (M Technique). The resin composition was added to the above-mentioned aqueous medium followed by stirring for 10 minutes at a rotating speed of 10,000 rpm to obtain a dispersed solution. The resulting dispersed solution was cooled to 25° C. over the course of 12 hours while stirring with a stirring blade followed by continuing to stir for 3 days at a temperature of 25° C. under normal pressure conditions to remove the toluene. When the particle diameter of the resulting resin particles was measured according to the Coulter method with a particle size distribution analyzer (Coulter Multisizer III, Coulter), the weight-average particle diameter was 5.5 μm. Subsequently, solid-liquid separation was carried out by washing and filtering with aqueous hydrochloric acid solution and further washing and filtering with ion exchange water. Next, the resulting solid fraction was dried to obtain toner 1. The resulting toner 1 had a weight-average particle diameter of 5.5 μm and a hollow structure.

Example 10

Production of Toner 2

Toner 2 was obtained in the same manner as Example 9 with the exception of using 40 parts by mass of toluene and 120 parts by mass of chloroform instead of 160 parts by mass of toluene. The resulting toner had a weight-average particle diameter of 5.5 μm and a solid structure. In addition, when the polyester resin formed in the toner was heated and dissolved in toluene at a concentration of 70% by mass and allowed to stand for 24 hours at 25° C., polyester resin 1 precipitated in the form of crystals. Moreover, when the polyester resin formed in the toner was heated and dissolved in chloroform at a concentration of 70% by mass and allowed to stand for 24 hours at 25° C., precipitation of polyester resin 1 was not observed.

Example 11

Production of Toner 3

Toner 3 was obtained in the same manner as Example 10 with the exception of adding 40 parts by mass of sodium chloride to the aqueous medium. The resulting toner had a weight-average particle diameter of 5.5 μm and a solid structure. As shown in Table 2, the degree of crystallinity increased considerably as a result of adding sodium chloride.

Examples 12 to 18

Production of Toners 4 to 10

Toners 4 to 10 were obtained in the same manner as Example 11 with the exception of changing pre-crystallization treatment resin 1 to polyester resins 2 to 8 prior to carrying out crystallization treatment. All of the resulting toners had a weight-average particle diameter of 5.5 μm and had solid structures.

Comparative Example 14

Production of Toner 11

The following materials:

| | |
|---|---|
| polyester resin 9 | 100 parts by mass |
| release agent (behenyl behenate, melting point: 75° C.) | 10 parts by mass |
| colorant (cyan pigment: Pigment Blue 15:3 Dainichiseika Color & Chemicals) | 5 parts by mass | were mixed, and the resulting mixture was melted and kneaded with a twin-screw extruder heated to 130° C. The resulting melt-kneading product was cooled and coarsely pulverized with a hammer mill. The resulting coarsely pulverized material was finely pulverized with a turbo mill and the resulting fine powder was classified with an air classifier to obtain toner 11 having a weight-average particle diameter of 7 μm.

Comparative Examples 15 to 17, 24 and 25

Production of Toners 12 to 14, 21 and 22

Toners 12 to 14, 21 and 22 were produced in the same manner as Comparative Example 14 with the exception of changing polyester resin 9 to polyester resin 10, 11, 13, 20 and 21, respectively. All of the resulting toners had a weight-average particle diameter of 7 μm.

Comparative Example 18

Production of Toner 15

Toner 15 having a weight-average particle diameter of 5.5 μm was obtained in the same manner as Example 11 with the exception of changing pre-crystallization treatment resin 1 to polyester resin 14, cooling the resulting dispersed solution from 80° C. to 50° C. over the course of 10 minutes while stirring with a stirring blade, and continuing to stir for 5 hours at a temperature of 50° C. to remove the toluene.

Comparative Examples 19 and 20

Production of Toners 16 and 17

Toners 16 and 17 were produced in the same manner as Comparative Example 18 with the exception of changing polyester resin 14 to polyester resins 15 and 16, respectively. Both of the resulting toners had a weight-average particle diameter of 5.5 μm.

Comparative Examples 21 to 23

Production of Toners 18 to 20

Toners 18 to 20 were produced in the same manner as Example 11 with the exception of changing pre-crystallization treatment resin 1 to polyester resins 17 to 19, respectively. All of the resulting toners had a weight-average particle diameter of 5.5 μm.

(Evaluation of Toners)
<Evaluation 1 of Blocking Property (Using a Sieve)>
After allowing 10 g of toner to stand undisturbed for 3 days at 40° C., the amount of toner remaining on a sieve having a mesh size of 75 μm after sifting for 120 seconds at a shaking width of 1 mm was evaluated based on the criteria indicated below. The evaluation results are shown in Table 2.

(Evaluation Criteria)
A: Amount of toner remaining of 10% or less
B: Amount of toner remaining of greater than 10%

<Evaluation 2 of Blocking Property (Storage Stability)>
1.8 parts by mass of silica fine particles subjected to hydrophobic treatment with silicone oil (specific surface area as measured according to BET method: 200 m$^2$/g) were dry-mixed with 100 parts by mass of toner with a Henschel mixer (Mitsui Mining). The toner was allowed to stand undisturbed for 3 days in a constant temperature and humidity bath at a temperature of 50° C. and humidity of 10% followed by visually evaluating the degree of blocking based on the criteria indicated below. The evaluation results are shown in Table 2.

(Evaluation Criteria)
A: No blocking after 3 days or easily dispersed by slight vibration even if present
B: Blocking present after 3 days, but able to be dispersed by continuous vibration
C: Blocking present after 3 days and unable to be dispersed even if vibrated <Evaluation of Low-Temperature Fixability>
1.8 parts by mass of silica fine particles subjected to hydrophobic treatment with silicone oil (specific surface area as measured according to BET method: 200 m$^2$/g) were dry-mixed with 100 parts by mass of toner with a Henschel mixer (Mitsui Mining). The toner was mixed with a ferrite carrier coated with silicone resin (average particle diameter: 42 μm) to a toner concentration of 8% by mass to prepare a two-component developer. The two-component developer was filled into a commercially available full-color digital copying machine (CLC1100, Canon) and an unfixed toner image (0.6 mg/cm$^2$) was formed on image receiving paper (64 g/m$^2$). A fixing unit removed from a commercially available full-color digital copying machine (image Runner Advance C5051, Canon) was modified to allow adjustment of fixation temperature, and a fixation test of the unfixed image was carried out using this modified fixing unit. Processing speed was set to 246 mm/sec at normal temperature and normal humidity, and the result of fixing the above-mentioned unfixed image was evaluated visually based on the criteria indicated below. The evaluation results are shown in Table 2.

(Evaluation Criteria)
A: Image is able to be fixed at or lower than 140° C.
B: Image is able to be fixed at higher than 140° C. and at or lower than 160° C.
C: Image is only able to be fixed at higher than 160° C.

<Evaluation of Charge Retention Rate>0.01 g of toner was weighed in an aluminum pan and charged to −600 V using a scorotron charger. Continuing, the behavior of changes in surface potential was measured for 30 minutes using a surface electrometer (Model 347, Trek Japan) in an atmosphere at a temperature of 25° C. and humidity of 50% RH. The measurement results were substituted into the following equation to calculate charge retention rate, and charge retention rate was evaluated based on the criteria indicated below. The evaluation results are shown in Table 2.

Charge retention rate after 30 minutes (%)=([surface potential after 30 minutes]/[initial surface potential])×100

(Evaluation Criteria)
A: Charge retention rate after 30 min of 90% or more
B: Charge retention rate after 30 min of less than 90% to 50% or more
C: Charge retention rate after 30 min of less than 50%

TABLE 2

| Toner | Resin | Crystallinity | Tg (°C.) | Melting point (°C.) | (Tg + 273)/(Mp + 273) | Degree of crystallinity (%) | Ratio of low diffraction angle components R (%) | H1 | H2 | H2/H1 |
|---|---|---|---|---|---|---|---|---|---|---|
| Example | | | | | | | | | | |
| 9 | 1 | 1 | Yes | 42 | 81 | 0.89 | 28 | 49 | 29 | 0 | 0 |
| 10 | 2 | 1 | Yes | 42 | 80 | 0.89 | 8 | 48 | 11 | 0 | 0 |
| 11 | 3 | 1 | Yes | 42 | 80 | 0.89 | 27 | 48 | 28 | 0 | 0 |
| 12 | 4 | 2 | Yes | 30 | 79 | 0.86 | 25 | 37 | 26 | 0 | 0 |
| 13 | 5 | 3 | Yes | 50 | 83 | 0.91 | 20 | 32 | 21 | 0 | 0 |
| 14 | 6 | 4 | Yes | 28 | 105 | 0.80 | 14 | 35 | 25 | 0 | 0 |
| 15 | 7 | 5 | Yes | 34 | 76 | 0.88 | 8 | 31 | 16 | 0 | 0 |
| 16 | 8 | 6 | Yes | 38 | 108 | 0.82 | 25 | 57 | 18 | 0 | 0 |
| 17 | 9 | 7 | Yes | 57 | 153 | 0.77 | 26 | 33 | 22 | 0 | 0 |
| 18 | 10 | 8 | Yes | 68 | 155 | 0.80 | 28 | 56 | 28 | 0 | 0 |
| Comparative Example | | | | | | | | | | |
| 14 | 11 | 9 | Yes | −62 | 65 | 0.62 | 52 | 3 | 95 | 75 | 0.79 |
| 15 | 12 | 10 | Yes | −57 | 74 | 0.62 | 49 | 3 | 129 | 110 | 0.85 |
| 16 | 13 | 11 | Yes | 38 | 210 | 0.64 | 28 | 29 | 65 | 64 | 0.98 |
| 17 | 14 | 13 | Yes | 65 | 235 | 0.67 | 39 | 15 | 43 | 39 | 0.91 |
| 18 | 15 | 14 | No | 42 | — | — | — | — | — | — | — |
| 19 | 16 | 15 | No | 58 | — | — | — | — | — | — | — |
| 20 | 17 | 16 | No | 68 | — | — | — | — | — | — | — |
| 21 | 18 | 17 | No | 30 | — | — | — | — | — | — | — |
| 22 | 19 | 18 | No | 73 | — | — | — | — | — | — | — |
| 23 | 20 | 19 | No | 58 | — | — | — | — | — | — | — |
| 24 | 21 | 20 | No | 56 | — | — | — | — | — | — | — |
| 25 | 22 | 21 | No | 56 | — | — | — | — | — | — | — |

| Toner | Resin | Crystallinity | Blocking Performance Evaluation 1 (Sieve) | Low-Temperature Fixability | Charge Retention Rate | Blocking Performance Evaluation 2 |
|---|---|---|---|---|---|---|
| Example | | | | | | |
| 9 | 1 | 1 | Yes | A | A | A | A |
| 10 | 2 | 1 | Yes | A | A | A | B |
| 11 | 3 | 1 | Yes | A | A | A | A |
| 12 | 4 | 2 | Yes | A | A | B | A |
| 13 | 5 | 3 | Yes | A | B | A | A |
| 14 | 6 | 4 | Yes | A | B | B | A |
| 15 | 7 | 5 | Yes | A | A | B | B |
| 16 | 8 | 6 | Yes | A | B | B | A |
| 17 | 9 | 7 | Yes | A | B | A | A |
| 18 | 10 | 8 | Yes | A | B | A | A |
| Comparative Example | | | | | | | |
| 14 | 11 | 9 | Yes | A | A | C | A |
| 15 | 12 | 10 | Yes | A | A | C | A |
| 16 | 13 | 11 | Yes | A | C | A | A |
| 17 | 14 | 13 | Yes | A | C | A | A |
| 18 | 15 | 14 | No | B | A | A | C |
| 19 | 16 | 15 | No | B | B | A | C |
| 20 | 17 | 16 | No | A | C | A | A |
| 21 | 18 | 17 | No | B | A | B | C |
| 22 | 19 | 18 | No | A | C | A | A |
| 23 | 20 | 19 | No | B | A | A | C |
| 24 | 21 | 20 | No | B | A | A | C |
| 25 | 22 | 21 | No | B | A | A | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-081252, filed on Apr. 9, 2013, which is hereby incorporated by reference herein in its entirety.

The invention claimed is:

1. A crystalline polyester resin for toner, satisfying the following relationships:

$$30 \leq R \leq 100$$

$$25 \leq Tg \leq 70$$

$$(Tg+273)/(Mp+273) \geq 0.75, \text{ and}$$

$$R = (I_{C20}/I_C) \times 100,$$

wherein R (%) represents a ratio of low diffraction angle components of the crystalline polyester resin for toner as calculated based on measurement by wide-angle X-ray diffraction, Tg (° C.) represents a glass transition temperature of the crystalline polyester resin for toner, Mp (° C.) represents a melting point of the crystalline polyester resin for toner, $I_{C20}$ indicates the total area of crystalline peaks detected within a range of $5 \leq 2\theta \leq 20$, $I_C$ indicates the total area of crystalline peaks detected within a range of $5 \leq 2\theta \leq 60$, and $2\theta$ indicates a diffraction angle (deg).

2. The crystalline polyester resin for toner according to claim 1, wherein a degree of crystallinity of the crystalline polyester resin for toner as measured by wide-angle X-ray diffraction is at least 10%.

3. The crystalline polyester resin for toner according to claim 1, wherein the crystalline polyester resin for toner is obtained by condensation polymerization of a dicarboxylic acid component containing at least one compound selected from the group consisting of terephthalic acid, 2,6-naphthalene dicarboxylic acid and derivatives thereof, and a diol component containing at least one compound selected from the group consisting of 2-methyl-1,3-propanediol, 2,2-dimethyl-1,3-propanediol and derivatives thereof.

4. The crystalline polyester resin for toner according to claim 3, wherein the diol component contains at least one compound selected from the group consisting of 2-methyl-1,3-propanediol, 2,2-dimethyl-1,3-propanediol and derivatives thereof in a total amount of at least 50% by mole in the diol component.

5. The crystalline polyester resin for toner according to claim 3, wherein the dicarboxylic acid component contains at least one compound selected from the group consisting of terephthalic acid, 2,6-naphthalene dicarboxylic acid and derivatives thereof in a total amount of at least 50% by mole in the dicarboxylic acid component.

6. The crystalline polyester resin for toner according to claim 1, wherein an amount of heat of fusion of the crystalline polyester resin for toner as measured by a differential scanning calorimeter satisfies $$H2/H1 \leq 0.1$$

wherein H1 (J/g) represents an amount of heat of fusion after a first temperature rise from 25° C. to 200° C. at a ramp rate of 10° C./min, and H2 (J/g) represents an amount of heat of fusion after a second temperature rise from 25° C. to 200° C. at a ramp rate of 10° C./min carried out after cooling to 25° C. at a cooling rate of 1° C./min after the first temperature rise and holding for 24 hours at 25° C.

7. The crystalline polyester resin for toner according to claim 1, wherein the weight-average molecular weight of the crystalline polyester resin for toner as measured by gel permeation chromatography is from 5,000 to 50,000.

8. A method for producing a toner, the toner comprising a crystalline polyester resin for toner, the crystalline polyester resin for toner, satisfying the following relationships:

$$25 \leq Tg \leq 70, \text{ and}$$

$$(Tg+273)/(Mp+273) \geq 0.75$$

wherein Tg (° C.) represents a glass transition temperature of the crystalline polyester resin for toner, and Mp (° C.) represents a melting point of the crystalline polyester resin for toner, the method comprising:

a resin dissolving step of obtaining a resin composition by dissolving, in an organic solvent, a polyester resin obtained by condensation polymerization of a dicarboxylic acid component containing at least one compound selected from the group consisting of terephthalic acid, 2,6-naphthalene dicarboxylic acid and derivatives thereof, and a diol component containing at least one compound selected from the group consisting of 2-methyl-1,3-propanediol, 2,2-dimethyl-1,3-propanediol and derivatives thereof;

a granulating step of obtaining a dispersion by dispersing the resulting resin composition in an aqueous medium; and a solvent removal step of removing the organic solvent from the resulting dispersion.

9. The method for producing the toner according to claim 8, wherein in the granulating step, the temperature of the aqueous medium is held at not less than 60° C. and not more than 100° C., and after the granulating step and before the solvent removal step or during the solvent removal step, the temperature of the aqueous medium is cooled at a cooling rate of at least 1° C./hr and not more than 50° C./hr.

10. The method for producing the toner according to claim 8, wherein the aqueous medium contains a monovalent metal salt at not less than 1% by mass and not more than 30% by mass.

11. The method for producing the toner according to claim 8, wherein the organic solvent contains at least an organic solvent A and an organic solvent B, the organic solvent A is a solvent that causes the polyester resin to precipitate when the polyester resin is dissolved in the organic solvent in the resin dissolving step at a concentration of 70% by mass and allowed to stand for 24 hours at 25° C., and the organic solvent B is a solvent that does not cause the polyester resin to precipitate when the polyester resin is dissolved in the organic solvent in the resin dissolving step at a concentration of 70% by mass and allowed to stand for 24 hours at 25° C.

12. The crystalline polyester resin for toner according to claim 1, wherein the melting point of the crystalline polyester resin for toner is not more than 125° C.

13. A toner comprising a crystalline polyester resin, wherein the crystalline polyester resin satisfies the following relationships:

$$30 \leq R \leq 100$$

$$25 \leq Tg \leq 70$$

$$(Tg+273)/(Mp+273) \geq 0.75, \text{ and}$$

$$R=(I_{C20}/I_C) \times 100,$$

wherein R (%) represents a ratio of low diffraction angle components of the crystalline polyester resin for toner as calculated based on measurement by wide-angle X-ray diffraction, Tg (° C.) represents a glass transition temperature of the crystalline polyester resin, Mp (° C.) represents a melting point of the crystalline polyester resin, $I_{C20}$ indicates the total area of crystalline peaks detected within a range of $5 \leq 2\theta \leq 20$, $I_{C2}$ indicates the total area of crystalline peaks detected within a range of $5 \leq 2\theta \leq 60$, and $2\theta$ indicates a diffraction angle (deg).

* * * * *